(12) United States Patent
McCollum et al.

(10) Patent No.: US 8,648,568 B2
(45) Date of Patent: Feb. 11, 2014

(54) BACKUP POWER SYSTEM MANAGEMENT

(75) Inventors: Peter McCollum, Colorado Springs, CO (US); Clay Wade, Colorado Springs, CO (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 434 days.

(21) Appl. No.: 12/812,570

(22) PCT Filed: Jan. 17, 2008

(86) PCT No.: PCT/US2008/051295
§ 371 (c)(1),
(2), (4) Date: Jul. 12, 2010

(87) PCT Pub. No.: WO2009/091395
PCT Pub. Date: Jul. 23, 2009

(65) Prior Publication Data
US 2010/0295513 A1    Nov. 25, 2010

(51) Int. Cl.
*H02J 7/00* (2006.01)
(52) U.S. Cl.
USPC ........... 320/116; 320/119; 320/121; 320/122; 320/124; 320/133; 713/300; 713/324; 307/48; 307/49; 307/50
(58) Field of Classification Search
USPC ........................................................ 320/116
See application file for complete search history.

(56) References Cited

U.S. PATENT DOCUMENTS

| | | | |
|---|---|---|---|
| 5,804,894 A * | 9/1998 | Leeson et al. ................. | 307/130 |
| 6,020,718 A | 2/2000 | Ozawa et al. | |
| 6,239,579 B1 * | 5/2001 | Dunn et al. ................... | 320/121 |
| 6,377,028 B1 * | 4/2002 | Armstrong et al. ........... | 320/136 |
| 6,424,123 B1 * | 7/2002 | Odaohhara et al. ........... | 320/134 |
| 6,462,507 B2 * | 10/2002 | Fisher, Jr. ..................... | 320/101 |
| 7,002,265 B2 * | 2/2006 | Potega .......................... | 307/149 |
| 7,921,309 B1 * | 4/2011 | Isbister et al. ................ | 713/300 |
| 2006/0017582 A1 * | 1/2006 | Lockhart et al. ........... | 340/636.1 |
| 2007/0040449 A1 * | 2/2007 | Spurlin et al. .................. | 307/64 |

FOREIGN PATENT DOCUMENTS

| | | |
|---|---|---|
| KR | 97-0003397 U | 1/1997 |
| KR | 20-0247576 | 10/2001 |
| KR | 20-0247576 Y1 | 10/2001 |

OTHER PUBLICATIONS

HPDC, Int'l Search Report & Written Opinion dated Sep. 30, 2008, Int'l App No. PCT/U52008/051295, 11 p.

* cited by examiner

*Primary Examiner* — Yalkew Fantu

(57) ABSTRACT

Systems and methods for management of a backup power system are described herein. At least one illustrative embodiment includes a backup power system configured to couple to a power source including a plurality of batteries, each comprising one or more cells, used to provide power if the power source fails, and processing logic coupled to the batteries and configured to monitor the state of each of the plurality of batteries and control the charging and discharging of each of the plurality of batteries. If the power source has not failed, the processing logic repeatedly and sequentially causes each battery to discharge while at least one of the remaining batteries remains fully charged, and monitors the power provided by the discharging battery. The processing logic determines the available energy stored in each fully charged battery based upon the power provided by the discharging battery during the time it takes to discharge.

23 Claims, 5 Drawing Sheets

BACKUP POWER SYSTEM MANAGEMENT

CROSS-REFERENCE TO RELATED APPLICATION

The present application claims priority to PCT/US2008/051295, filed 17 Jan. 2008, hereby incorporated herein by reference.

BACKGROUND

With a growing number of services being provided by servers across computer networks, a continually increasing effort is being focused on improving the availability of such servers. Battery backups, uninterruptable power supplies (UPSs), redundant server components, and redundant servers have all seen widespread use in recent years, particularly by large-scale computer network service providers. But as the market for network services has continued to grow, the level of competition between service providers has also grown. As a result, service providers are exploring new alternative designs and configurations that improve system availability, but that also lower the complexity and cost of the resulting system.

BRIEF DESCRIPTION OF THE DRAWINGS

For a detailed description of exemplary embodiments of the invention, reference will now be made to the accompanying drawings in which.

NOTATION AND NOMENCLATURE

Certain terms are used throughout the following description and claims to refer to particular system components. As one skilled in the art will appreciate, computer companies may refer to a component by different names. This document does not intend to distinguish between components that differ in name but not function. In the following discussion and in the claims, the terms "including" and "comprising" are used in an open-ended fashion, and thus should be interpreted to mean "including, but not limited to . . . ." Also, the term "couple" or "couples" is intended to mean either an indirect, direct, optical or wireless electrical connection. Thus, if a first device couples to a second device, that connection may be through a direct electrical connection, through an indirect electrical connection via other devices and connections, through an optical electrical connection, or through a wireless electrical connection. Additionally, the term "system" refers to a collection of two or more hardware and/or software components, and may be used to refer to an electronic device, such as a computer, a portion of a computer, a combination of computers, etc. Further, the term "software" includes any executable code capable of running on a processor, regardless of the media used to store the software. Thus, code stored in non-volatile memory, and sometimes referred to as "embedded firmware," is included within the definition of software.

DETAILED DESCRIPTION

The following discussion is directed to various embodiments of the invention. Although one or more of these embodiments may be preferred, the embodiments disclosed should not be interpreted, or otherwise used, as limiting the scope of the disclosure, including the claims. In addition, one skilled in the art will understand that the following description has broad application, and the discussion of any embodiment is meant only to be exemplary of that embodiment, and not intended to intimate that the scope of the disclosure, including the claims, is limited to that embodiment.

Figure 1:
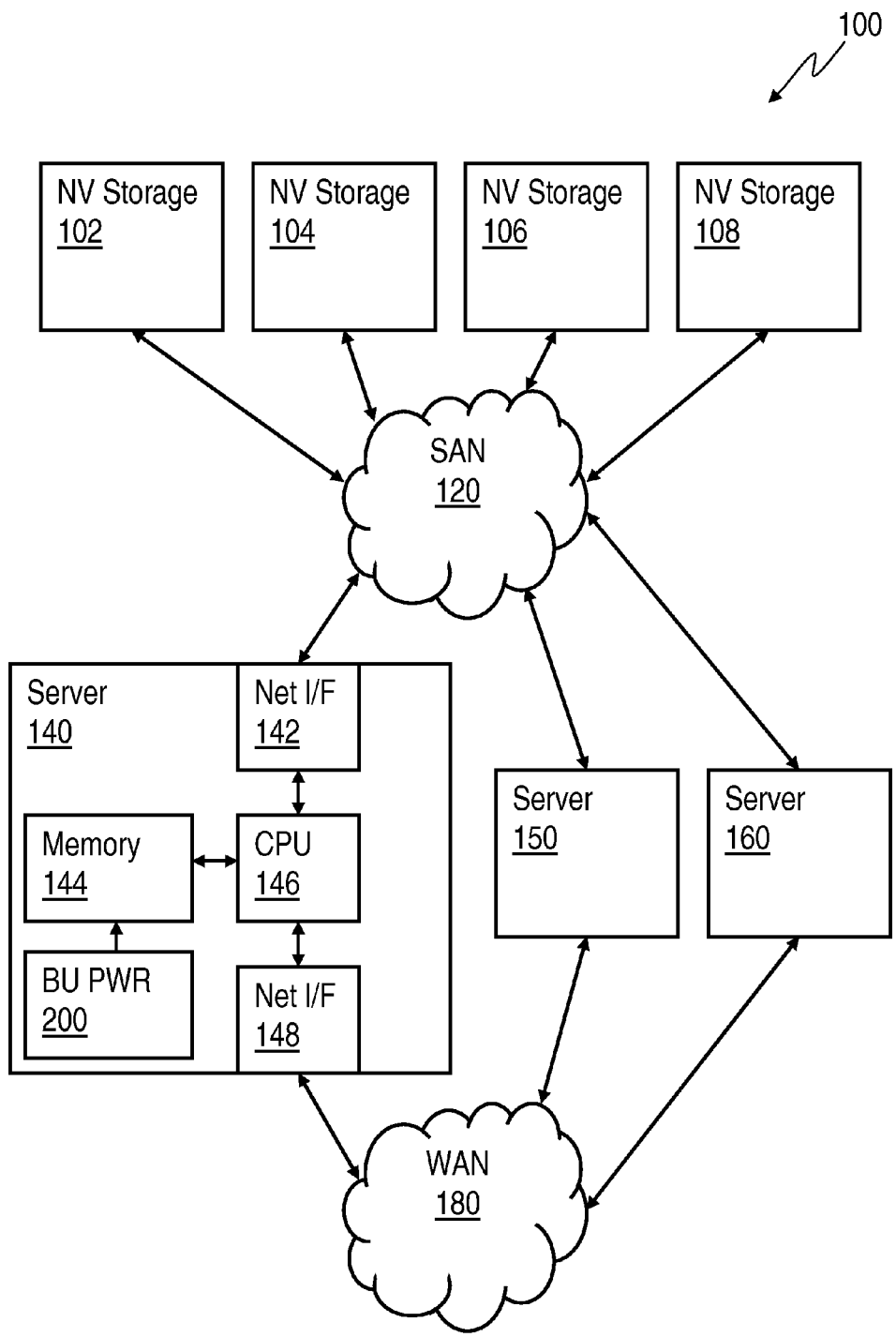
FIG. 1 shows a server system that includes a server incorporating a backup power system constructed in accordance with at least some illustrative embodiments.

FIG. 1 shows a server system 100 that includes multiple servers, each including a backup power system (BU PWR) 200 constructed in accordance with at least some illustrative embodiments. Each server (140, 150 and 160) couples to both wide area network (WAN) 180 (e.g., the Internet), and a group of non-volatile storage devices (NV Storage) 102 through 108 via storage area network (SAN) 120. FIG. 1 also shows the internal organization of server 140, which includes a network interface (Net I/F) 142 that couples the server to SAN 120, and a network interface 148 that couples the server to WAN 180. CPU 146 couples to both network interfaces and processes the information to and from SAN 120 and WAN 180. CPU 146 also couples to memory 144, which couples to backup power system 200.

In the illustrative embodiment of FIG. 1, each server reads and writes data from and to one or more of the non-volatile storage devices 102 through 108. For example, server 140 may be operated as a web server that provides web pages to users, and that reads and writes data in a database stored on a hard drive within one of the non-volatile storage devices. In order to optimize the performance of the server, in at least some illustrative embodiments data is maintained within memory 144, serving as a "cache" for both read and write operations from and to the disk drive. If a catastrophic power failure within the facility housing the servers occurs before cached data within memory 144 is written (or "committed") to the disk drive, backup power system 200 maintains power to memory 144 in order to forestall the loss of data until power can be restored.

The amount of stored energy required of backup power system 200 depends upon the power consumption rate of memory 144, and upon the quality of service guaranteed by the operator of server system 100. For example, if the operator of server system 100 has guaranteed a server up time of 99.95% (sometimes referred to as "three-nine-five" reliability), then no server can be offline more than approximately 4½ hours total per year (i.e., 365 days*(1−0.9995)*24 hours-per-day=4.38 hours). If the system operator has further guaranteed that data from completed transactions will not be lost, then backup power system 200 must be capable of maintaining power to memory 144 for at least the maximum projected down time to avoid such a data loss. In the example described, backup power system 200 would need to store at least enough energy to power memory 144 for approximately 4½ hours to avoid the loss of the data cached in memory 144. More energy may be required in order to account for failures in some of the energy storage elements (e.g., batteries within backup power system 200), longer than expected outages, higher than expected power consumption, or any of a number of other unanticipated conditions or failures. Once power is restored, the cached write data within memory 144 can be written to the appropriate disk drive.

Figure 2:
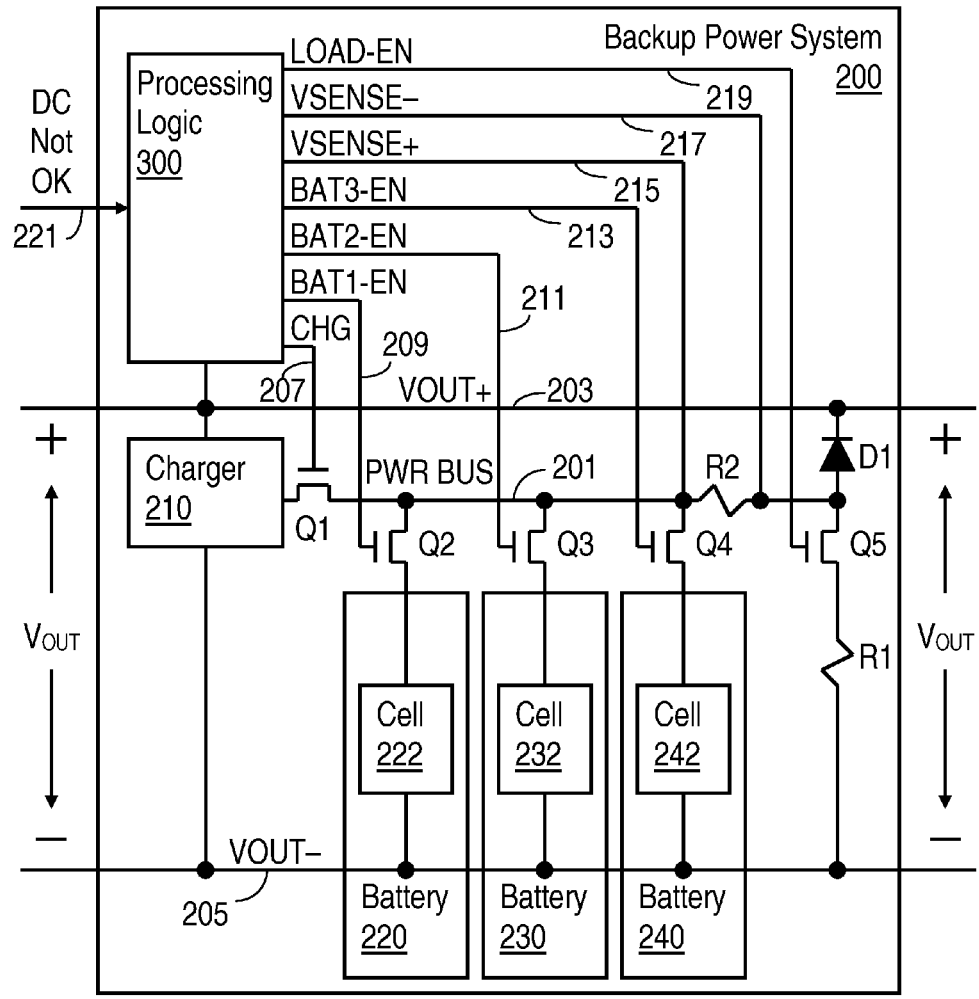
FIG. 2 shows block diagram of a power backup system, constructed in accordance with at least some illustrative embodiments.

FIG. 2 shows a diagram of backup power system 200, constructed in accordance with at least some illustrative embodiments. Backup power system 200 includes batteries 220, 230 and 240, each including a storage cell (cells 222, 232, and 242 respectively). Although only one cell per battery is shown in the illustrative embodiment shown in FIG. 2, those of ordinary skill in the art will recognize that other illustrative embodiments may include batteries with more than one cell per battery, and that the cells within a battery may be coupled to each other in series, in parallel, or any combination thereof. All such numbers and combinations of cells are within the scope of the present disclosure.

The negative lead of each battery couples to common return node (VOUT−) 205, which is the return path (e.g., ground) of the primary power supply (not shown) that couples to backup power system 200. The positive lead of each battery of the illustrative embodiment of FIG. 2 couples to a pass transistor (e.g., metal-oxide semiconductor field-effect transistors (MOSFETs) Q2 through Q4), which each act as a switch to couple or de-couple the corresponding battery to power bus (PWR BUS) 201. The gates of each pass transistor (Q2 through Q4) are coupled to processing logic 300, which produces the battery enable signals for each pass transistor (BAT1-EN signal 209, BAT2-EN signal 211 and BAT3-EN signal 213). When a battery enable signal is asserted, the pass transistor corresponding to the enabled signal couples the corresponding battery to power bus 201. Similarly, pass transistor Q1 couples charger 210 to power bus 201, and is controlled by processing logic 300 via charge (CHG) signal 207. When charge signal 207 is asserted, charger 210 charges those batteries that are coupled to power bus 201.

Sense resistor R2 couples power bus 201 to both blocking diode D1 and pass transistor Q5. The sense voltage across sense resistor R2 is the voltage difference between the positive sense signal (VSENSE+) 215 on power bus 201 and the negative sense signal (VSENSE−) 217 at the node where blocking diode D1, transistor Q5 and sense resistor R2 couple to each other. The sense voltage permits processing logic 300 to monitor the amount of power being provided by the batteries (when not being charged) to either synthetic load resistor R1, or the real load (not shown) coupled between primary power node (VOUT+) 203 and common return node (VOUT−) 205. The power delivered during the discharge of the battery is calculated using the relationship $P=V^2/R$, where P is the power in watts, V is the voltage across sense resistor R2 in volts, and R is the resistance value of sense resistor R2 in Ohms.

By integrating the measured power over the time it takes for a battery to transition from a fully charged state to a discharged state, the total energy of the battery when fully charged (e.g., in watt-seconds) is determined. Further, the positive sense signal is also used by processing logic 300 to monitor the voltage of the power bus relative to common return node 205 (i.e., the voltage of the batteries currently coupled to power bus 201). Although only the overall battery voltage is monitored in the illustrative embodiment shown in FIG. 2, other illustrative embodiments may be configured to permit monitoring the voltage of each individual cell within each battery (e.g., if multi-cell batteries are used), and all such embodiments are within the scope of the present disclosure.

The term "discharged," as used in the present disclosure, does not necessarily mean fully discharged or at zero volts. In at least some illustrative embodiments, batteries with lithium-ion cells are used. Such cells are damaged if allowed to drop below 3.0 volts. Thus, in an embodiment such as the one in FIG. 2, the discharge time is the time it takes a battery to transition from a fully charged level of 4.2 volts to a discharged level of 3.0 volts. Those of ordinary skill in the art will recognize that other illustrative embodiments may include other different types of batteries with different maximum (charged) and minimum (discharged) voltages, and all such batteries and voltages are within the scope of the present disclosure.

Continuing to refer to FIG. 2, pass transistor Q5 couples to blocking diode D1 and sense resistor R2, and to synthetic load resistor R1. As with the other pass transistors, the gate of pass transistor Q5 is coupled to processing logic 300. When processing logic 300 asserts load enable (LOAD-EN) signal 219, pass transistor Q5 is enabled and couples synthetic load resistor R1 to blocking diode D1 and sense resistor R2. Because of the orientation of blocking diode D1, when pass transistor Q5 is enabled, synthetic load resistor R1 presents a load to those batteries that are coupled to power bus 201, but not to the primary power supply coupled across primary power node 203 and common return node 205.

By selectively enabling and disabling different pass transistors, processing logic 300 selectively charges or discharges one or more batteries within backup power system 200, while the real load is being provided power by an external primary power supply. By sequentially discharging each battery through synthetic load resistor R1 and measuring the power provided during the discharge, processing logic 300 determines the energy stored within each battery when fully charged. For example, in at least some illustrative embodiments, if all three batteries 220, 230 and 240 are fully charged, processing logic begins a test sequence by disabling pass transistor Q1 (halting the charging process), enabling Q2 (coupling battery 220 to power bus 201), disabling pass transistors Q3 and Q4 (de-coupling batteries 230 and 240 from power bus 201), and enabling pass transistor Q5 (coupling synthetic load resistor R1 to power bus 201 via sense resistor R2). Because the batteries of the illustrative embodiment of FIG. 2 are charged to a voltage that is at or below the voltage level of the primary power supply (voltage $V_{OUT}$), current will not flow through blocking diode D1, but will flow through synthetic load resistor R1. The discharge current also flows through sense resistor R2, which permits processing logic 300 to monitor and log the power provided by the discharging battery.

Once the discharging battery has reached its minimum operating voltage (i.e., is discharged), pass transistor Q5 is disabled, halting the discharge of the battery. Processing logic 300 subsequently re-enables pass transistor Q1 to begin re-charging the battery just discharged. In at least some illustrative embodiments, processing logic 300 compares the measured energy delivered by the discharged battery to a minimum operating threshold value. If the energy delivered during the discharge test is below the minimum operating threshold value, the battery is marked as failed. Processing logic 300 then asserts a signal which, in at least some illustrative embodiments, causes a message or indication to be sent to an external monitoring system, and/or triggers a local indicator such as a light or LED, or an audible alarm. The message or indication alerts the operator of a system that includes backup power system 200 that corrective action is needed (e.g., replacing the defective battery or the backup power system 200 itself), and indicative of which battery has failed. A battery that is marked as failed is not used by processing logic 300 to provide power in the event of a failure of the primary power supply.

Once all the batteries have each been sequentially discharge tested as described above, the total energy of all the batteries combined is calculated by processing logic 300 (e.g., by adding together the stored energy values measured for each battery) and is compared to a minimum reserve threshold value. If the total combined energy of the batteries is less than the minimum reserve threshold value, processing logic asserts a signal which, in at least some illustrative embodiments, causes a message or indication to be sent to an external monitoring system, and/or triggers a local indicator such as a light or LED, or an audible alarm. The message or indication alerts the operator of a system that includes backup power system 200 that corrective action is needed. Such action may include, for example, replacing backup power system 200 with another similar system with a greater energy storage capacity, or adding additional backup power systems 200, if the system incorporating backup power system 200 is capable of accepting and coupling to multiple backup power systems.

In at least some illustrative embodiments, the minimum operating and reserve threshold values are programmable values that are set based upon the type of batteries used and the energy requirements of the system in which the backup power system 200 is installed. Other criteria for determining the minimum operating and reserve threshold values will become apparent to those of ordinary skill in the art, and all such criteria are within the scope of the present disclosure.

In at least some illustrative embodiments, discharge testing of a battery will not be performed unless the energy stored in the remaining batteries is at or above the level of energy required to meet the requirements of a system coupled to backup power system 200. Depending upon the energy storage capacity of the cells and batteries used, backup power system 200 may be capable of performing discharge testing of the batteries even if a battery has failed. In the illustrative embodiment of FIG. 2, for example, the ability to continue performing discharge testing, despite the failure of a battery, requires sizing the batteries such that a single battery is capable of providing the required energy (e.g., by increasing the number of cells per battery), or alternatively requires using a greater number of batteries. When so sized or reconfigured, backup power system 200 is capable of providing the necessary power even if one battery has failed, and another is discharged or partially discharged due to an in-progress discharge test.

In at least some illustrative embodiments, discharge testing is performed repeatedly in order to regularly assess the energy capacity and general health and status of the batteries and cells. Thus, if a battery begins to deteriorate with time and age, it is identified before the deterioration leaves the backup power system 200 incapable of providing the necessary energy. The problem can be resolved before the deterioration compromises the required reliability of a system coupled to backup power system 200. Such testing may be repeated often enough to maintain an accurate measure of the capacity of the battery, but not so often as to significantly reduce the life cycle of the battery. In at least some illustrative embodiments, for example, discharge testing is performed once every 28 days.

In the illustrative embodiment of FIG. 2, at least one battery is coupled to power bus 201 at all times in order to guarantee that power will not be interrupted in the event of a failure of the primary power supply, regardless of the state of backup power system 200. Thus, even if backup power system 200 is in the middle of discharge testing a battery, that battery will provide power through blocking diode D1 long enough for processing logic 300 to uncouple synthetic load R1, couple a fully charged battery to power bus 201, and uncouple the discharging battery from power bus 201. Whenever processing logic 300 couples and uncouples batteries from power bus 201, the coupling and uncoupling is performed using a "make-before-break" ordering. This guarantees that at least one battery is coupled to the power bus at all times. Although coupling a fully charged battery and a battery with less of a charge on bus 201 at the same time does result in significant current flow from the fully charged battery to the battery with a lower charge level, the switching of the batteries is performed such that the overlap time is maintained low enough to prevent battery damage (e.g., 5 milliseconds or less).

Processing logic 300 monitors DC Not OK signal 221 in order to detect a failure of the primary power supply. If DC Not OK signal 221 is asserted by the primary power supply, a failure of the primary supply is identified by processing logic 300 as imminent (e.g., will occur within approximately 10 milliseconds). When such a failure is signaled, processing logic 300 ends any discharge testing that is in progress (i.e., any charging or discharging of a battery in progress) and couples the battery with the highest voltage level (or at least one of several, if more than one are fully charged) to power bus 201, and uncouples any battery that was undergoing discharge testing (if such testing was in progress). As already noted, all coupling and decoupling of batteries is performed in a make-before-break order. Although a signal from the primary power supply is used in the illustrative embodiment of FIG. 2 by backup power system 200 to determine when a power supply failure has occurred, those of ordinary skill will recognize that many other techniques for detecting a failure of the primary power supply are suitable to detect such failures (e.g., direct monitoring of primary power node 203 by processing logic 300), and all such techniques are within the scope of the present disclosure.

As the battery coupled to bus 201 discharges, processing logic compares the voltage level on power bus 201 to the voltage level of the batteries not coupled to the bus. The voltage level of each battery may be determined based upon the last recorded voltage of the battery when last charged, or via additional sensing lines (not shown) coupling the positive node of each battery to processing logic 300. When the difference between the voltage level of power bus 201 and the voltage of an uncoupled battery decreases below a minimum voltage difference threshold value, the uncoupled battery is coupled to power bus 201, allowing both batteries to discharge together in parallel. The minimum voltage difference threshold value is selected such that currents that flow between the batteries are too small to cause any damage to the batteries. As with the minimum operating and reserve threshold values, in at least some illustrative embodiments the minimum voltage difference threshold value is a programmable value.

The process of coupling additional uncoupled batteries to power bus 201 continues, until all batteries not flagged as failed are coupled to power bus 201 and are discharging together in parallel. By coupling as many batteries in parallel as possible whenever the relative voltage differences are below the minimum voltage difference threshold, the batteries are discharged in a manner that optimizes the use of the stored energy within the batteries, and provides the most efficient delivery of the stored energy.

In at least some illustrative embodiments, processing logic 300 also monitors the discharge of the batteries during a primary power supply failure. The measurements are sampled and stored as before, based upon the voltage across sense resistor R2. Once the primary power supply resumes operation, the energy remaining in the batteries is determined by subtracting the energy provided during the failure from the total energy that was available prior to the failure. If the remaining energy is below a minimum threshold (e.g., the minimum reserve threshold value described above), one or more of the batteries are recharged. Once recharged, the previously measured energy value (determined through a discharge test performed prior to the failure) is used as the total available energy value, at least until a subsequent discharge test can be performed.

In at least some illustrative embodiments, processing logic 300 also monitors the voltage level of power bus 201 to detect under-voltage conditions (i.e., a voltage below the minimum operating voltage of the batteries) and over-voltage conditions (i.e., a voltage above the maximum operating voltage of the batteries), both of which can damage the cells within the batteries. Such conditions may result from a short circuit in the real load, or from a failure of the primary power supply (other than a shutdown or power failure). If processing logic 300 detects such conditions, the battery enable signals 209, 211 and 213 are de-asserted, causing all the batteries (220, 230 and 240) to be de-coupled from power bus 201, in order to protect the batteries from damage.

Figure 3:
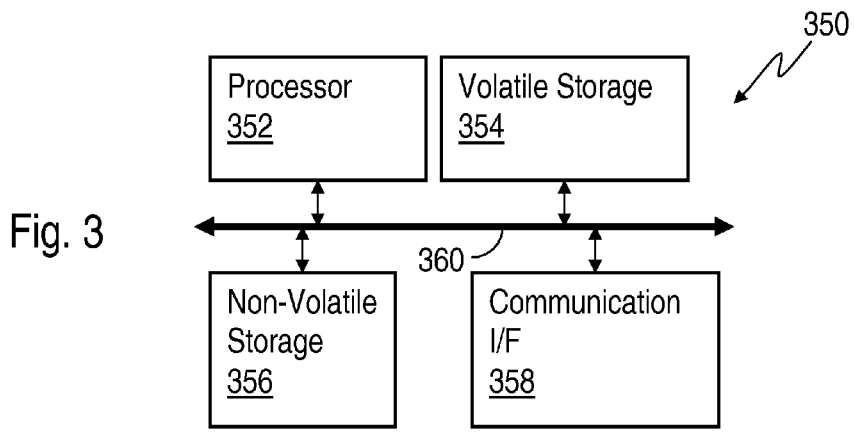
FIG. 3 shows a block diagram of a system configuration, suitable for use as the processing logic of FIG. 2, in accordance with at least some illustrative embodiments.

FIG. 3 show an illustrative computer system 350 suitable for use as processing logic 300 of FIG. 1. The computer system 350 includes processor 352, volatile storage 354, and non-volatile storage 356, each coupled to each other via bus 360. Processor 352 may be implemented in hardware (e.g., a microprocessor), software (e.g., microcode), or a combination of hardware and software. Computer system 350 also includes a computer-readable medium. The computer-readable medium includes volatile storage 354 (e.g., random access memory (RAM)), non-volatile storage 356 (e.g., flash RAM, read-only memory (ROM), a floppy disk (not shown), a compact disk read-only memory (CD-ROM, not shown), or combinations thereof, just to name a few examples.

Either or both of volatile storage 354 and non-volatile storage 356 include, for example, software that is executed by processor 352 and provides the computer system 350 with some or all of the functionality described herein. The computer system 350 also includes a communication interface (Communication I/F) 358, also coupled to bus 360, which enables the computer system 350 to receive information via any number of wired and/or wireless communication media and protocols (e.g., RS-232 serial communications, IEEE 802.11 wireless communications, universal serial bus (USB) communications, and Ethernet network communications). Computer system 350 may be a bus-based computer, with a variety of busses (e.g., a peripheral component interconnect (PCI) bus) interconnecting the various elements shown in FIG. 3.

The processor 352 gathers information from other system elements, including input data from the components of backup power system 200, and program instructions and other data from non-volatile storage 354 or volatile storage 356, or from other systems (e.g., a server used to store and distribute copies of executable code) coupled to computer system 350 via communication interface 358. The processor 352 executes the program instructions and processes the data accordingly. The program instructions may further configure the processor 352 to send data to other system elements, such as status, event and/or alarm information related to the condition of backup power system 200. Volatile storage 354 may serve as a low-latency temporary store of information for the processor 352, and non-volatile storage 356 may serve as a long term (but higher latency) store of information.

The processor 352, and hence the computer system 350 as a whole, operates in accordance with one or more programs stored on non-volatile storage 354 or received via the communication interface 358. The processor 352 may copy portions of the programs into volatile storage 354 for faster access, and may switch between programs or carry out additional programs in response to conditions detected within backup power system 200, or based upon commands received via communication interface 358. The additional programs may be retrieved from non-volatile storage 354 or may be retrieved or received from other locations via the communication interface 358. One or more of these programs executes on computer system 350, causing the computer system to perform at least some functions disclosed herein.

Figure 4:
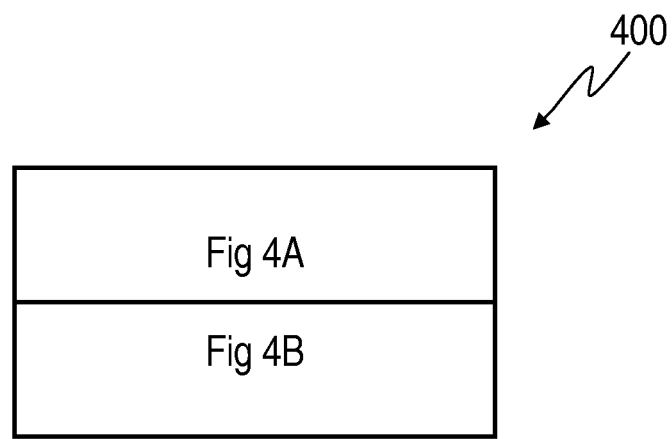
FIG. 4 (which includes FIGS. 4A and 4B combined) shows a method for operating a power backup system, in accordance with at least some illustrative embodiments.
Figure 4A:
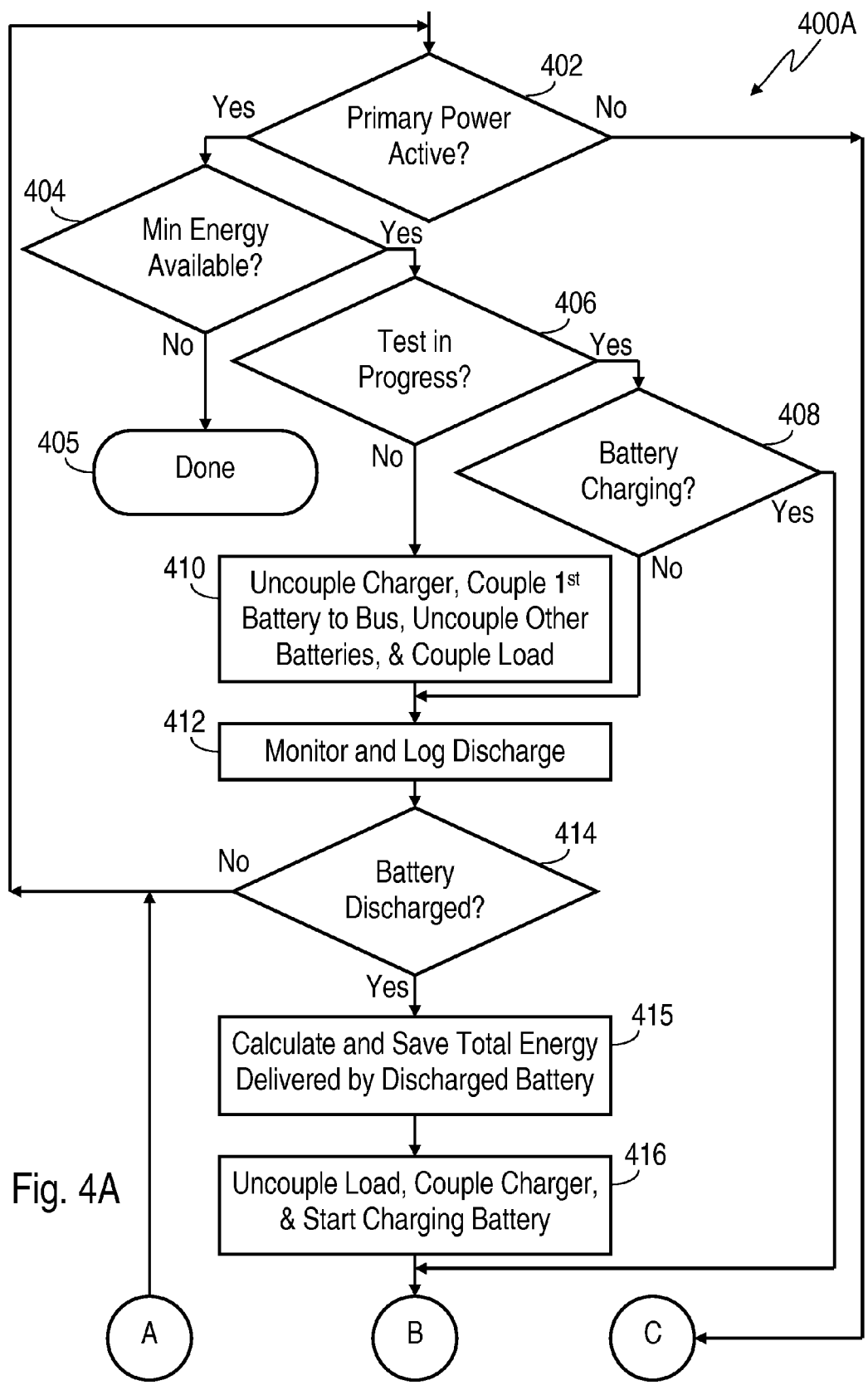
Figure 4B:
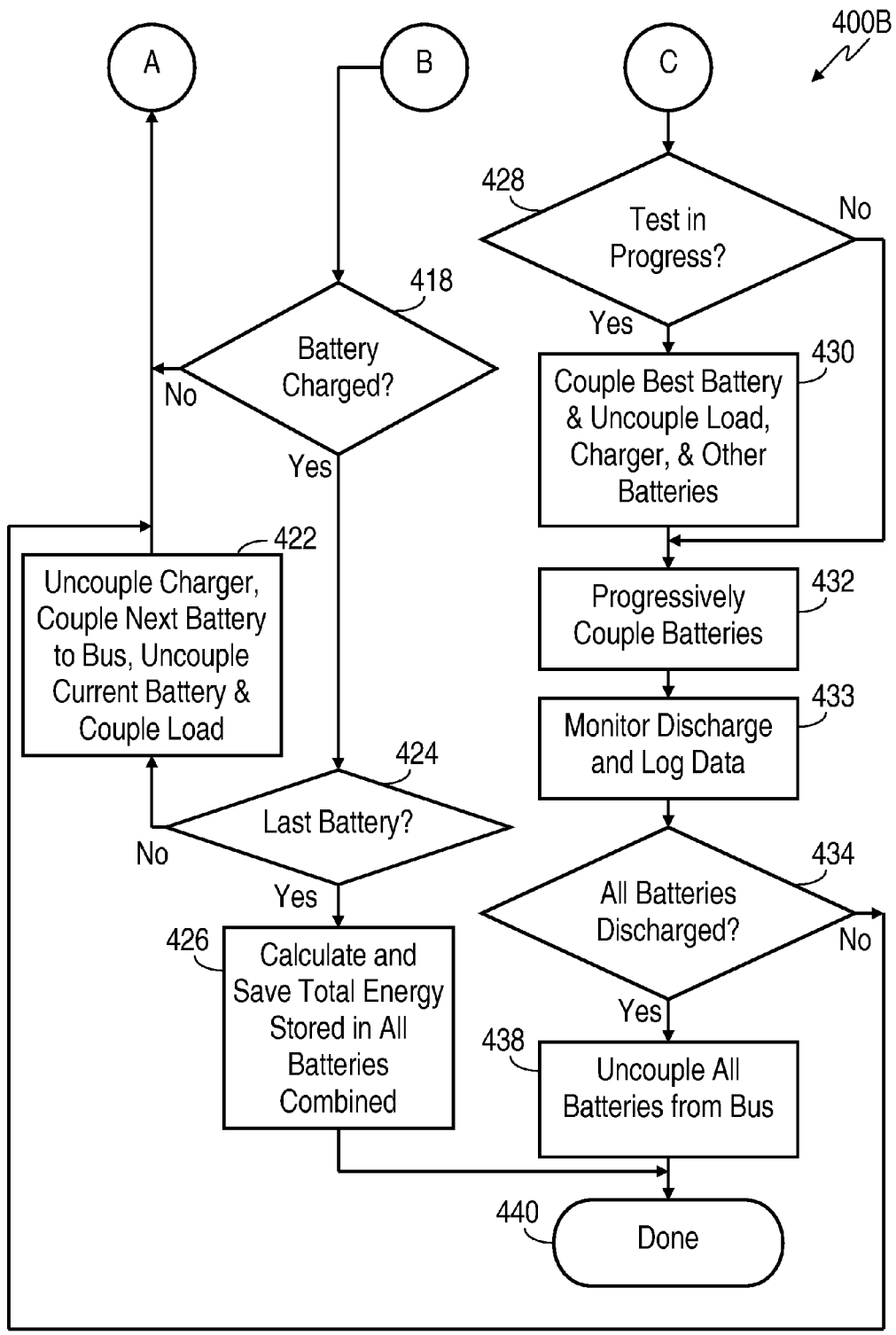

FIG. 4 (which includes FIGS. 4A and 4B) shows a method 400 for operating the backup power system 200 of FIG. 2, in accordance with at least some illustrative embodiments. The method may be executed on demand (e.g., in response to an externally provided command), or as part of a periodic schedule (e.g., in response to the expiration of a timer). Referring to both FIGS. 2 and 4, upon determining that the primary power supply is active and providing power (block 402), processing logic 300 determines whether the batteries currently available (not including the battery to be tested) have enough energy stored to meet the power requirements of the system coupled to backup power system 200, in the event of a power failure (block 404). If the remaining batteries are not above a minimum reserve threshold value, the method ends (block 405). If the remaining batteries are above the minimum reserve threshold value (block 404) and a discharge test is not in progress (block 406), processing logic decouples charger 210 from power bus 201, couples the first battery to be tested to power bus 201, uncouples the remaining batteries, and couples synthetic load resistor R1 to power bus 201 via sense resistor R2 (block 410). Once configured for discharge testing in block 410, the discharge of the battery under test is monitored, and sampled measurements are logged (block 412). If a test is already in progress (block 406) and the battery is not charging (block 408), the discharging battery under test continues to be monitored, and sampled measurements continue to be logged (block 412).

After sampling and logging measurements in block 412, processing logic 300 checks to determine if the battery is discharged (block 414). If not yet discharged, blocks 402 through 412 are selectively repeated until processing logic 300 determines that the battery is discharged (block 414). Once the battery is discharged, processing logic 300 calculates and saves the total energy delivered by the discharged battery (block 415), which represents the current energy storage capacity of the battery. After calculating the energy storage capacity of the battery, processing logic 300 uncouples synthetic load resistor R1 from power bus 201 and couples charger 210 to the bus, starting the charging cycle of the battery just tested (block 416). Once charging is started in block 416, or if the battery was already charging (block 408) as part of an in-progress test (block 406), processing logic 300 determines whether the battery has been fully charged (block 418). If not, blocks 402 through 416 are selectively repeated.

If the battery is fully charged (block 418), processing logic 300 determines if all batteries have been tested (block 424). If all batteries have not been tested, charger 210 is uncoupled from power bus 201, the next battery to be tested is coupled to the bus, the already tested and re-charged battery is uncoupled from the bus, and synthetic load resistor R1 is coupled to the bus via sense resistor R2 (block 422). Blocks 202 through 418 are then selectively repeated, until the last battery has been tested. When the last battery has been re-charged (block 418) and tested (block 424), processing logic 300 decouples charger 210 from the bus and calculates and saves the total energy stored by all the batteries combined (block 426), ending the method (block 440). In at least some illustrative embodiments, if the amount of energy stored within an individual battery fails to reach a minimum operating threshold value, the battery is flagged as failed and a signal is generated indicative of the failure (not shown). Similarly, in other illustrative embodiments, if the total energy stored by all the batteries not flagged as failed is below a minimum reserve threshold value, a signal is generated (not shown) indicative of the failure to meet the energy storage requirements of the system coupled to backup power system 200.

Continuing to refer to FIGS. 2 and 4, if the primary power supply is not active (block 402), and a discharge test is already in progress (block 428), processing logic 300 couples the battery with the highest charge level (or one of several fully charged batteries) to power bus 201, uncouples charger 210 from the bus, uncouples synthetic load resistor R1 from the bus, and uncouples the remaining batteries from the bus (block 430). After reconfiguring backup power system 200 as described in block 430, or after determining that a test is not in progress (block 428), processing logic 300 progressively couples additional uncoupled batteries to power bus 201 (block 432) as the battery or batteries that are already coupled to the bus discharge to a voltage level that differs from at least one uncoupled battery by less than a minimum voltage difference threshold value, as previously described. Processing logic 300 monitors the discharge of the battery or batteries coupled to power bus 201 and logs power data that is sampled via voltage sense signals 215 and 217 (block 433). The logged power data provides the information needed to determine the overall energy delivered by the discharging batteries. Once all batteries have reached their minimum operating voltage (block 434), processing logic 300 uncouples all the batteries from power bus 201 (block 438), ending the method (block 440). If all of the batteries have not yet discharged (block 434), the method is repeated starting at block 402.

The above discussion is meant to be illustrative of the principles and various embodiments of the present invention. Numerous variations and modifications will become apparent to those skilled in the art once the above disclosure is fully appreciated. For example, although the embodiments described herein include backup power systems that provide backup power to an individual computer system component (e.g., memory 144 of FIG. 1), other illustrative embodiments may include a backup power system that is incorporated into a power supply and that provides power to an entire computer system. Still other illustrative embodiments may include an uninterruptible power supply (UPS) that includes the backup power system described, wherein the UPS is external to, and provides power to, one or more computer systems. It is intended that the following claims be interpreted to embrace all such variations and modifications.

What is claimed is:

1. A backup power system configured to be coupled to a power source, comprising:
    a plurality of batteries each comprising one or more cells and used to provide power if a power source fails; and
    processing logic coupled to the plurality of batteries, configured to monitor a state of each of the plurality of batteries, and further configured to control a charging and discharging of each of the plurality of batteries;
    wherein, if the power source has not failed, the processing logic repeatedly and sequentially causes each of the plurality of batteries to discharge while at least one of the remaining batteries remains fully charged, and further monitors a power provided by each of the plurality of batteries while discharging;
    wherein the processing logic determines an available energy stored in each discharging battery when fully charged based upon a power provided by the discharging battery during a time it takes for the discharging battery to discharge; and
    wherein the processing logic causes a battery of the plurality of batteries not to be used to provide backup power based on the battery's available energy being determined to be below a minimum operating threshold value.

2. The backup power system of claim 1, further comprising a synthetic load, wherein the processing logic causes the discharging battery to couple to the synthetic load and to discharge through the synthetic load.

3. The backup power system of claim 1, wherein the discharge of each of the plurality of batteries is not performed if the at least one of the remaining batteries combined do not store enough combined energy to equal or exceed a minimum energy reserve threshold value.

4. The backup power system of claim 1, wherein the processing logic generates a signal when the battery is made unavailable, the signal indicative of which of the plurality of batteries has an available energy level below the minimum operating threshold value.

5. The backup power system of claim 1, wherein at least one battery is coupled to a power-providing node of the system during normal operation of the backup power system.

6. The backup power system of claim 1, wherein the processing logic causes the plurality of batteries to be uncoupled from a power-providing node if the processing logic detects a voltage at the power-providing node above a maximum operating voltage, or below a minimum operating voltage.

7. The backup power system of claim 1,
    wherein a first battery of the plurality of batteries is coupled to a power-providing node, and a second battery of the plurality of batteries is not coupled to the power-providing node; and
    wherein if the processing logic detects a failure of the power source, and further detects that the difference between the voltage of the first battery and the second battery is less than a minimum voltage difference threshold value, the processing logic causes the second battery to be coupled to the power-providing node.

8. A method of maintaining a backup power system configured to be coupled to a power source, comprising:
    storing power in a plurality of batteries each battery comprising one or more cells and used to provide power if a power source fails;
    monitoring the state of each of the plurality of batteries;
    repeatedly and sequentially discharging each battery of the plurality of batteries while at least one of the remaining batteries of the plurality remains fully charged, if a primary power source, which provides power to a device external and coupled to each battery, has not failed;
    monitoring the power delivered by each discharging battery over time;
    determining the energy stored within each discharging battery based upon the power delivered over a discharge time of each discharging battery;
    causing a battery of the plurality of batteries to not be used to provide backup power and for recharging based on the battery's available energy being determined to be below a minimum operating threshold; and
    charging each battery of the plurality of batteries after discharging.

9. The method of claim 8, wherein repeatedly discharging each battery comprises coupling each battery to a synthetic load.

10. The method of claim 8, further comprising repeatedly discharging each battery by providing power to a device external and coupled to each battery, if the primary power source previously providing power to the device has failed.

11. The method of claim 8, wherein repeatedly discharging each battery is not performed unless the total energy stored in each of the remaining plurality of batteries combined equals or exceeds a minimum reserve threshold value.

12. The method of claim 8, further comprising identifying a battery of the plurality of batteries as failed if the energy stored within the battery is below a minimum operating threshold value.

13. The method of claim 12, further comprising generating a signal indicating which of the plurality of batteries has failed.

14. The method of claim 8, further comprising uncoupling the plurality of batteries from an external device if the voltage measured at a power input node of the external device is above a maximum operating voltage, or below a minimum operating voltage.

15. The method of claim 8, further comprising:
monitoring a first voltage of a first battery of the plurality of batteries, the first battery coupled to, and discharging through, a device external to the plurality of batteries;
monitoring a second voltage of a second battery of the plurality of batteries, the second battery not coupled to the device; and
coupling the second battery to the device when the difference between the first voltage and the second voltage is below a minimum voltage difference threshold value.

16. A non-transitory computer-readable storage medium for maintaining a backup power system configured to be coupled to a power source, comprising software that causes a processor to:
cause power to be stored in a plurality of batteries;
monitor the state of each of the plurality of batteries;
repeatedly and sequentially cause the discharge of each of the plurality of batteries while at least one of the remaining batteries of the plurality remains fully charged, if a primary power source, which provides power to a device external and coupled to each battery, has not failed;
monitor the power delivered by each discharging battery over time;
determine the energy stored within each discharging battery based upon the power delivered over a discharge time of each discharging battery;
cause a battery of the plurality of batteries to not be used to provide backup power and for recharging based on the battery's available energy being determined to be below a minimum operating threshold; and
cause each battery of the plurality of batteries to be charged after discharge.

17. The non-transitory computer-readable storage medium of claim 16, wherein repeatedly causing the discharge of each battery comprises causing each battery to be coupled to a synthetic load.

18. The non-transitory computer-readable storage medium of claim 16, the software further causing the processor to repeatedly cause the discharge of each battery by causing each battery to provide power to a device external and coupled to each battery if the primary power source previously providing power to the device has failed.

19. The non-transitory computer-readable storage medium of claim 16, wherein the software does not cause the processor to repeatedly cause the discharge of each battery unless the total energy stored in each of the remaining plurality of batteries combined equals or exceeds a minimum reserve threshold value.

20. The non-transitory computer-readable storage medium of claim 16, the software further causing the processor to identify a battery of the plurality of batteries as failed if the energy stored within the battery is below a minimum operating threshold value.

21. The non-transitory computer-readable storage medium of claim 20, the software further causing the processor to generate a signal indicating which of the plurality of batteries has failed.

22. The non-transitory computer-readable storage medium of claim 16, the software further causing the processor to uncouple the plurality of batteries from an external device if the voltage measured at a power input node of the external device is above a maximum operating voltage, or below a minimum operating voltage.

23. The non-transitory computer-readable storage medium of claim 16, the software further causing the processor to:
monitor a first voltage of a first battery of the plurality of batteries, the first battery coupled to, and discharging through, a device external to the plurality of batteries;
monitor a second voltage of a second battery of the plurality of batteries, the second battery not coupled to the device; and
couple the second battery to the device when the difference between the first voltage and the second voltage is below a minimum voltage difference threshold value.

* * * * *